(12) United States Patent
Seshadrinathan et al.

(10) Patent No.: US 9,691,140 B2
(45) Date of Patent: Jun. 27, 2017

(54) GLOBAL MATCHING OF MULTIPLE IMAGES

(71) Applicant: Intel Corporation, Santa Clara, CA (US)

(72) Inventors: Kalpana Seshadrinathan, Santa Clara, CA (US); Yi Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 14/529,948

(22) Filed: Oct. 31, 2014

(65) Prior Publication Data

US 2016/0127616 A1    May 5, 2016

(51) Int. Cl.
*H04N 5/217* (2011.01)
*G06T 5/40* (2006.01)
*G06T 5/50* (2006.01)
*G06T 5/00* (2006.01)
*H04N 5/232* (2006.01)
*H04N 13/00* (2006.01)

(52) U.S. Cl.
CPC ............... *G06T 5/40* (2013.01); *G06T 5/007* (2013.01); *G06T 5/50* (2013.01); *H04N 5/23229* (2013.01); *H04N 2013/0081* (2013.01)

(58) Field of Classification Search
CPC ......... H04N 5/2173; G06T 5/007; G06T 5/40; G06T 5/50
See application file for complete search history.

(56) References Cited

U.S. PATENT DOCUMENTS 6,650,774 B1 * 11/2003 Szeliski ................. G06T 5/008
                                                       348/225.1
7,756,359 B1    7/2010 Nord et al.
2002/0001416 A1 1/2002 Zhou et al.
(Continued)

FOREIGN PATENT DOCUMENTS

EP         2648157 A1   10/2013

OTHER PUBLICATIONS

International Search Report and Written Opinion for International Patent Application No. PCT/US2015/046952, mailed on Nov. 27, 2015.

*Primary Examiner* — David F Dunphy
(74) *Attorney, Agent, or Firm* — Green, Howard & Mughal LLP.

(57) ABSTRACT

Global matching of pixel data across multiple images. Pixel values of an input image are modified to better match a reference image with a slope thresholded histogram matching function. Visual artifacts are reduced by avoiding large pixel value modifications. For large intensity variations across the input and reference image, the slope of the mapping function is thresholded. Modification to the input image is therefore limited and a corresponding modification to the reference image is made to improve the image matching. More than two images may be matched by iteratively modifying a cumulative mass function of a reference image to accommodate thresholded modification of multiple input images. A device may include logic to match pixel values across a plurality of image frames generated from a plurality of image sensors on the device. Once matched, image frames may be reliably processed further for pixel correspondence, or otherwise.

21 Claims, 9 Drawing Sheets

(56) References Cited

U.S. PATENT DOCUMENTS

| | | | |
|---|---|---|---|
| 2003/0117654 A1* | 6/2003 | Wredenhagen | H04N 1/4074 358/3.21 |
| 2009/0110274 A1* | 4/2009 | Atanassov | G06T 5/009 382/169 |
| 2010/0278423 A1* | 11/2010 | Itoh | G06T 5/008 382/169 |
| 2011/0249893 A1 | 10/2011 | Bamidele et al. | |
| 2012/0127371 A1* | 5/2012 | Watanabe | G06T 5/007 348/687 |
| 2012/0242665 A1* | 9/2012 | Peng | G06T 5/40 345/426 |
| 2012/0263386 A1 | 10/2012 | Schlosser et al. | |
| 2014/0192267 A1* | 7/2014 | Biswas | G06T 5/002 348/701 |
| 2015/0294180 A1* | 10/2015 | Hong | H04N 5/217 382/168 |

* cited by examiner

GLOBAL MATCHING OF MULTIPLE IMAGES

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. As illustrated in FIG. 1A, a camera 110 may acquire multiple images 101, 102 in a time-sequential manner (e.g., in video mode). As illustrated in FIG. 1B, multiple cameras 110, 190 embedded in the same device platform may acquire the images 101, 102 at one instant in time (e.g., in a stereo image mode). In either of the modes illustrated in FIGS. 1A and 1B, pixel values between images 101 and 102 may be mismatched over time and/or between cameras as a result of different exposures, white balance, and/or different camera sensor/pipeline response characteristics.

In many visual processing applications, such as object tracking, motion estimation, and disparity/depth estimation, the images 101 and 102 are processed to determine pixel correspondence between the two images. Pixel correspondence is often determined by computing errors/correlations between images, which further relies on the relative pixel value (e.g., color, intensity) ranges being normalized or matched during a pre-processing operation. Unfortunately, pixel value normalization can induce visual artifacts, particularly when performed on images with widely varying intensity levels. Such visual artifacts are also detrimental to subsequent pixel correspondence determinations.

Automated global matching of images that can be implemented by ultra light and low-power mobile platforms and results in fewer visual artifacts is therefore highly advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
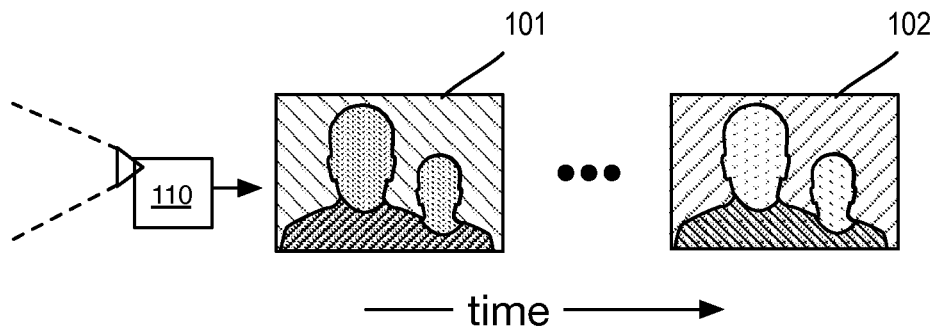
FIGS. 1A, and 1B are schematics of temporally and/or spatially correlated image (frames) with mismatched pixel value ranges to be normalized in accordance with embodiments.
Figure 1B:
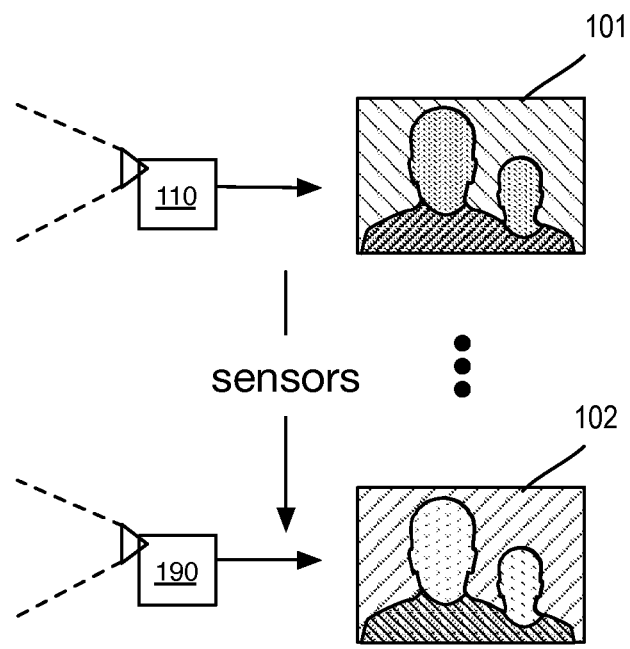

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for global matching of pixel data across multiple images based on slope thresholded histogram matching functions. Visual artifacts are reduced by avoiding large pixel value modifications to one input image. For large intensity variations across images (e.g., an input image and a reference image), the slope of the mapping function is thresholded by limiting the difference in the value changes between consecutive pairs of pixel values. Modification to the input image is therefore limited. In further embodiments, a corresponding modification to the second (reference) image is made to improve image matching. As described further below, second pixel values of the pair in both the input and reference images can be changed by the threshold amount added to the amount by which the first pixel value in the pair was changed.

Figure 2A:
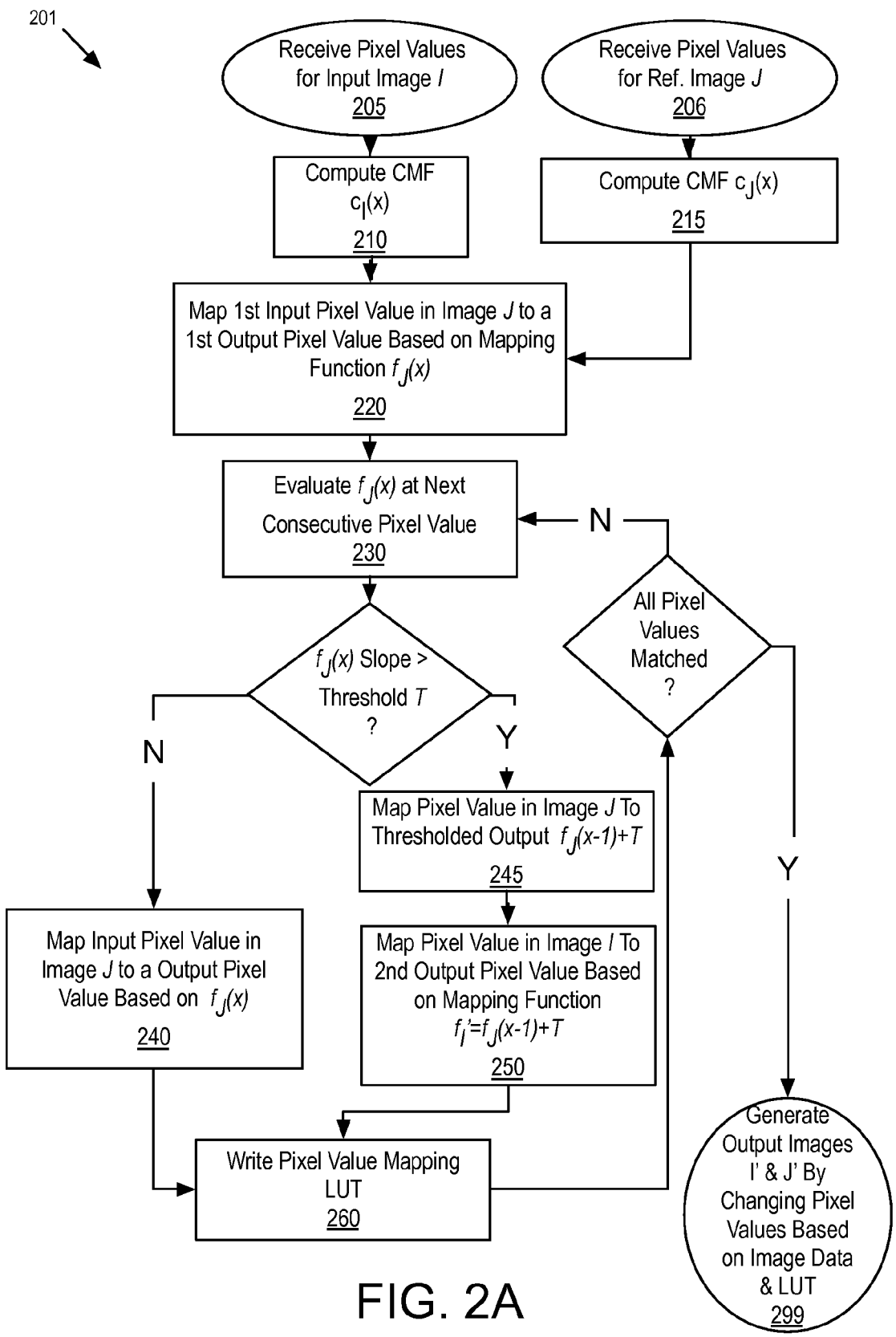
FIG. 2A is a flow diagram of a method of matching pixel values across two input images with a thresholded mapping function slope, in accordance with one or more embodiment.

FIG. 2A is a flow diagram of a method 201 for matching pixel values across two input images with a thresholded mapping function slope, in accordance with one or more embodiment. Method 201 is to be implemented automatically by thresholded pixel value matching device including at least a processor further having logic circuitry. Method 201 is therefore referred to herein as a "computer-implemented" method. Method 201 is a global matching technique with a single mapping function for each image. As such, method 201 is fast and computational efficient, and as described further below may be implemented as one or more look up table (LUT).

Method 201 begins at operation 205 where pixel values for a first input image I are received. Pixel values for a second input image J are received at operation 260. Input image I may be further considered a reference image. Designation of the reference may be based on any criteria, and embodiments are not limited in this respect. In exemplary embodiments, image data associated with a higher resolution image, or image data scoring higher for an alternate quality metric, is predetermined to be received as the reference input image I. Input image data received at operations 205, 206 are representations of an image frame provided in any suitable color space or image file format. For example, the input image data may be a decoded representation of an image stored in a memory. In another example, a CM writes the input image data to a buffer as the data is readout from an image sensor in the CM. The input image data includes a plurality of pixel values that are spatially correlated within an image frame. The number of pixel values within one frame of image data depends on the input image resolution, which in further embodiments is a function of a local CM. Although embodiments herein are applicable to any input image resolution, in an exemplary embodiment the input image data of image I is at least a 1920×1080 pixel (2.1 megapixel) representation of an image frame (i.e. Full HD), and advantageously 8 megapixel, or more, while the input image data of image J has a lower resolution (e.g., a 1280×720 representation of an image frame). In exemplary embodiments, the pixel values received as input image data rat operations 205, 206 are intensity values in the YUV, HSL, or HSV, $YP_BP_R$, or $YC_BC_R$ color spaces. In alternate embodiments, the pixel values received as input image data rat operations 205, 206 are color values for one channel in the RGB color space. Although for clarity, method 201 is described in the context of one channel value, method 201 may be readily applied to multiple channels (e.g., 3-channel color images) simply be performing method 201 separately for each color channel.

Figure 3A:
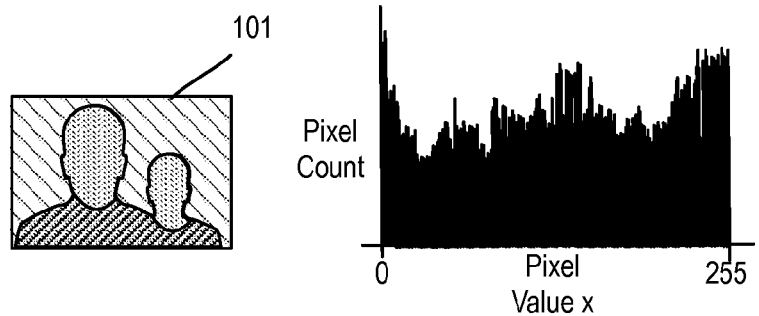
FIGS. 3A, 3B, 3C, and 3D further illustrate aspects of the methods depicted in FIG. 2A and FIG. 2B, in accordance with one or more embodiment.
Figure 3B:
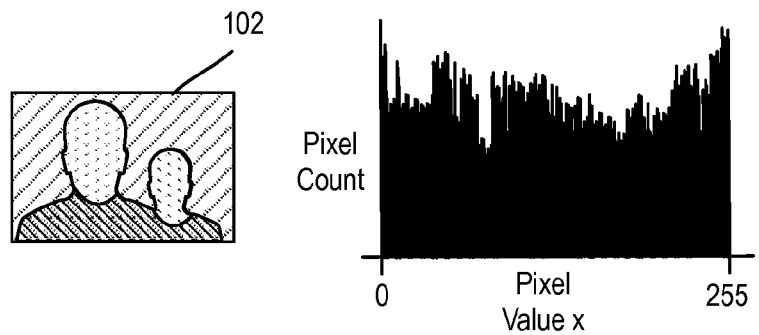

Method 201 continues with computing the cumulative mass function (CMF) of pixel values x for input image I at operation 210. At operation 211, the CMF of input image J is likewise computed. Computation of the CMF for image I, denoted herein as $c_I(x)$, and CMF for image J, denoted herein as $c_J(x)$, may be through any technique known to be applicable for histogram matching. In advantageous embodiments where the images are received from multiple camera modules and/or sensors, a margin is cropped from both images before computing the CMF. Cropping is to remove areas not suitable for matching because of viewpoint differences between the cameras that result in scene areas being visible in only one of the images. FIG. 3A is a histogram representing a probability mass function $p_I(x)$ for pixel values 0 through 255 for an 8-bit color channel (24 bit RGB) associated with input image I, for example. Probability mass function $p_I(x)$ is defined as the probability of occurrence of pixel value x in input image I. FIG. 3B is a histogram representing a probability mass function $p_J(x)$ for pixel values 0 through 255 for an 8-bit color channel associated with input image J.

Figure 3C:
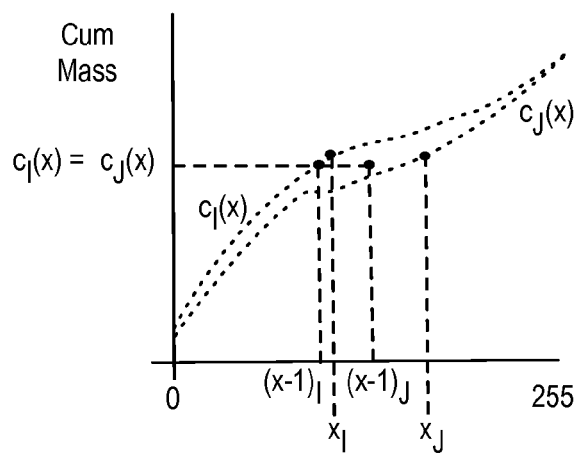
Figure 3D:
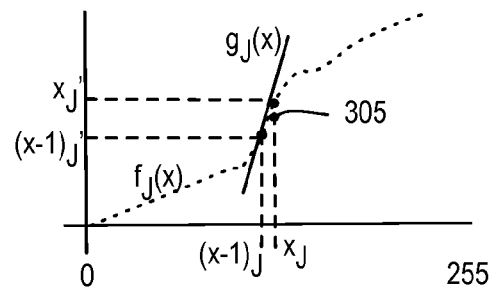

FIG. 3C illustrates exemplary CMFs $c_I(x)$ and $c_J(x)$. The inventors have observed that visual artifacts may occur in image J where an input pixel value $x_J$ is mapped to (replaced by, or changed to) $x_I$ when there are large intensity variations across the input images I, J. The inventors have further understood that intensity variations can be reflected by the slope of the mapping function and so in advantageous embodiments, the slope of the mapping function is to be limited to a predetermined threshold, T. FIG. 3D illustrates a mapping function $f_J(x)$ mapping an input pixel value x to an output pixel value x'. As further illustrated in FIG. 3D, a slope of mapping function $f_J(x)$ is given as $g_J(x)$ defined for an ordered listing of consecutive pixel values (e.g., 0 . . . 255) as:

$$g_J(x) = \begin{cases} f_J(x) - f_J(x-1) & \text{if } x > 0 \\ 0 & \text{if } x = 0 \end{cases} \quad (1)$$

As such, the mapping function slope $g_J(x)$ may be determined by computing the difference between the mapping function $f_J(x)$ evaluated at a first input pixel value (e.g., $x_J$) and the mapping function $f_J(x)$ evaluated at the second input pixel value (e.g., $(x-1)_J$), where the first and second pixel values are consecutive values. In accordance with an advantageous embodiment, the slope of the mapping function $g_J(x)$ is limited to the threshold T at every pixel value x where $g_J(x)$ exceeds the threshold T:

$$f'_J = \begin{cases} f_J(x-1) + T & \text{if } g_J(x) > T \\ f_J(x) & \text{otherwise} \end{cases} \quad (2)$$

where T is a predetermined value that may be empirically determined. Hence, mapping follows $f_J(x)$ for pixel values where the slope $g_J(x)$ does not exceed threshold T The mapping function $f_J(x)$ is applied at least at pixel value x=0 following Eq. (1). Referring again to FIG. 2A, method 201 therefore continues with operation 220 where a first pixel value in image J is mapped to an output pixel value associated with a reference pixel value in image I based on mapping function $f_J(x)$. In the exemplary embodiment illustrated in FIG. 2A, the mapping function $f_J(x)$ employed at operation 220 is a histogram matching function, based on the CMFs $c_I(x)$ and $c_J(x)$:

$$f_J(x) = c_I^{-1}[c_J(x)]. \quad (3)$$

At operation 230, mapping function $f_J(x)$ is evaluated at the next consecutive pixel value. If mapping function slope between the current pixel value and the prior consecutive pixel value does not exceed threshold T, method 201 proceeds to operation 240 where the pixel value in image I is again mapped to an output pixel value associated with another reference pixel value in image I based on mapping function $f_J(x)$. As illustrated in FIG. 3D for example, pixel value $(x-1)_J$ is mapped to a new value $(x-1)'_J$.

In response to the mapping function slope exceeding threshold T between the current pixel value and the prior consecutive pixel value, method 201 proceeds to operation 245 where the input pixel value in image J is mapped to an output pixel value x' equal to the threshold T added to the amount by which the immediately preceding input pixel value differs from its mapped output pixel value. As illustrated in FIG. 3D for example, pixel value $(x)_J$ is mapped to an output value 305 less then $f_J(x)$ as limited by threshold T. Hence, the input pixel values of image I are to be consecutively mapped to first output pixel values that differ from the input pixel values by the lesser of the difference between the input pixel value and a reference pixel value associated with the input pixel value by the mapping function, and the threshold T added to the amount by which a consecutive input pixel value (e.g. the immediately preceding input pixel value) differs from its mapped output pixel value.

With the new mapping function $f'_J(x)$ avoiding large slopes greater than T, in further embodiments a corresponding mapping function $f'_I(x)$ is applied to the reference image I, to generate second output pixel values that further improve the match between the two input images I and J. In the exemplary embodiment illustrated in FIG. 2A, at operation 250 reference pixel values in the input image I are mapped by mapping function $f'_I(x)$, expressed mathematically as:

$$f'_I(x) = \begin{cases} f_J(x-1) + T \text{ for } x \in \{f_J(x-1) + T, \ldots, f_J(x)\} & \text{if } g_J(x) > T \\ x & \text{otherwise} \end{cases} \quad (4)$$

Following Eq. (4), a reference image pixel value $x_I$ associated by $f_J(x)$ to an input pixel value that is thresholded to a first output value less than the difference between the input pixel value $x_J$ and the reference pixel value $x_I$ is mapped to a new pixel value closer to the thresholded first output pixel value. To avoid inducing artifacts in the reference image, the same threshold value T is applied such that the reference pixel value $x_I$ is allowed to change by the same amount that the mapped input pixel value $x_J$ is allowed to change ($f_J(x-1)+T$). All reference pixel values in the set from where the last consecutive pixel was mapped without thresholding, through the reference pixel value associated with the thresholded input pixel are mapped following $f'_I(x)$. As further denoted by Eq. (4), the mapping function $f'_I(x)$ is merely x where the slope $g_J(x)$ does not exceed threshold T.

Method 201 continues at operation 260, with output pixel values for both images J and I written/stored to a lookup table (LUT). The LUT(s) implement the mapping functions $f'_J(x)$ and $f'_I(x)$, associating input pixel values (e.g., 256 pixel intensity or color values) with output pixel values that are to be generated for all value occurrences within the images J and I. Because both the images I and J are to be changed as needed to limit the mapping function slope, a LUT table associated with image I (e.g., $LUT_I$), and a LUT table associated with and image J (e.g., $LUT_J$) may be populated at operation 260. Method 201 iterates through all input pixel values consecutively (e.g., from 0 to 255) until the LUTs are populated to map all input pixel values to a matched output pixel value. Method 201 then ends at operation 299 where two matched output images I' and J' are written to memory by operating globally on all pixels in each of the input images I and J. Input pixel values are thereby changed to output pixel values based on the corresponding LUT to effectively change all occurrences of the input pixel values to their matched output pixel values. In the exemplary embodiment, histogram matched images I' and J' stored to memory are given by:

$$I' = f'_I(I), \text{ and} \quad (5)$$

$$J' = f'_J(J). \quad (6)$$

Figure 4:
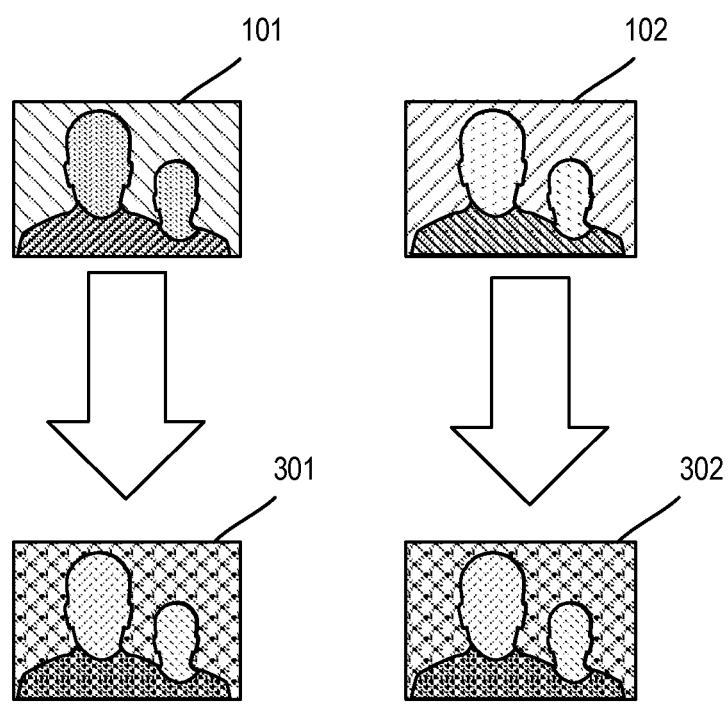
FIG. 4 illustrates generation of two output image frames generated based on a thresholded mapping function and two mismatched input image frames, in accordance with an embodiment.

Thus, an output image I' and an output image J' is generated as an output of method 201 for each pair of input images. FIG. 4 illustrates an output image 301 generated from input image 101, and an output image 302 generated from input image 102. Both images 101 and 102 undergo a change in one or more pixel values to arrive at the matched output images 301 and 302.

Notably, method 201 is extendable to more than two images. Three or more images may be acquired either by a single camera in a time sequential manner, or from an array of three or more cameras, each of which acquires an image of the same scene at one time instant. The camera array may be arranged in an arbitrary configuration as embodiments herein are not limited in this respect. The goal of the matching algorithm is to match each of the input images $J_k$ (where k=1, 2, . . . L) to the reference image I, where any of the input images may be chosen as the reference image.

Figure 2B:
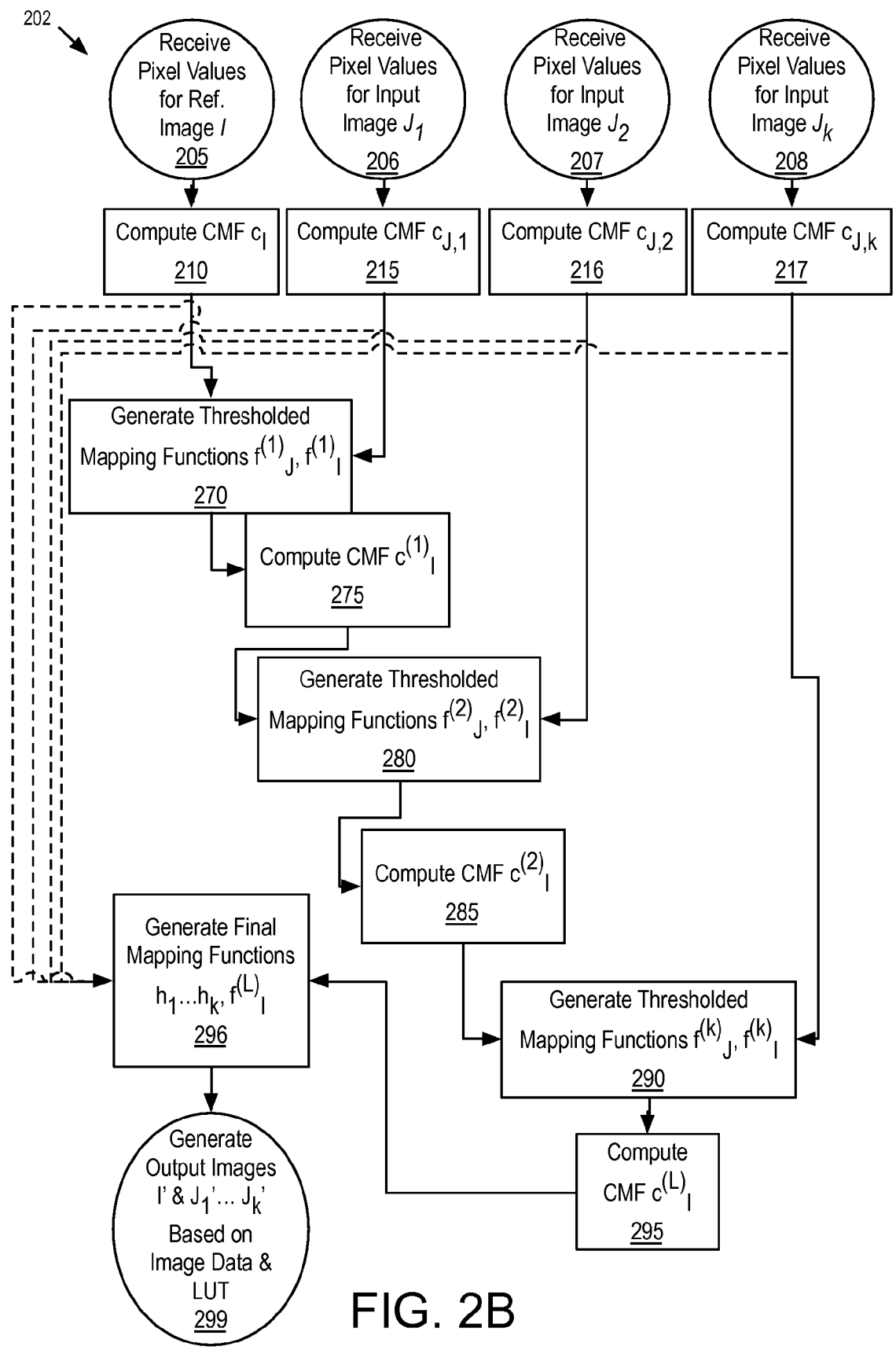
FIG. 2B is a flow diagram of a method of matching pixel values across a more than two input images with a thresholded mapping function slope, in accordance with one or more embodiment.

FIG. 2B is a flow diagram of a method 202 for matching pixel values across a more than two input images with a thresholded mapping function slope, in accordance with one or more embodiment. Method 202 begins with receiving L input images, including one reference image I received at operation 205 and k input images received at operations 206 ($J_1$), 207 ($J_2$), and 208 ($J_k$). Each of the images received at operations 205-208 may be as described above for operations 205, 206 in FIG. 2A. The cumulative mass functions for each of the L received images are then computed at operations 210 ($c_I$), 215 ($c_{J,1}$), 216 ($c_{J,2}$), and 217 ($c_{J,K}$). Method 202 then proceeds to operation 270 where thresholded mapping functions $f^{(1)}_J$, $f^{(1)}_I$ are generated, for example by performing method 201 (e.g., operations 220 through 260) to generate mapping LUT(s) as described above.

Method 202 continues to operation 275, where, because of the reference image pixel value mapping, a new cumulative mass function $c^{(1)}_I$ indicative of the modified reference pixel values is computed as:

$$c'_I(x) = \begin{cases} c_I[f_J(x)] & \text{for } x = f_J(x-1) + T & \text{if } g_J(x) > T \\ c_I(x-1) & \text{for } x \in \{f_J(x-1+T, \ldots, f_J(x)\} & \text{if } g_J(x) > T \\ c_I(x) & & \text{otherwise} \end{cases} \quad (7)$$

Eq. (7) therefore is an extension of Eq. (2) and (4), which together enable an iterative matching process, for example as illustrated in FIG. 2B. Notably, image $I^{(1)}$ does not need to be generated (e.g., at operation 299, FIG. 2A) as only $c^{(1)}_I$ is needed as a further input into operation 280. Thresholded mapping functions, $f^{(2)}_J$, $f^{(2)}_I$ are generated at operation 280, for example by performing method 201 (e.g., operations 220 through 260) to generate LUT(s) as described above. Method 202 continues to operation 285, where another new cumulative mass function $c^{(2)}_I$ indicative of the now twice modified reference pixel values is computed. Thresholded mapping functions $f^{(K)}_J$, $f^{(K)}_I$ are generated at operation 290, for example by performing method 201 (e.g., operations 220 through 260) to generate LUT(s) as described above. At operation 296, final, non-thresholded mapping functions $h_K$ (K=1, 2 . . . K) and $f^{(L)}_I$ are computed, for example by applying histogram matching Eq. (3) across each $c_J$, and $c^{(L)}_I$. At operation 299 the final matched output images I' and $J_1'$ through $J_K'$ are generated as:

$$I' = f_I^{(L)}(I), \text{ and} \quad (8)$$

$$J_k' = h_k(J_k), k=1,2, \ldots K. \quad (9)$$

Notably, iterative application of Eq. (2), (4), and (7) only decreases the slope of the new CMF of the reference image I, and cannot increase it. Thus, upon completion of method 202, the images defined by Eq. (8) and (9) satisfy the criterion that the slope of the mapping function does not exceed the threshold T for any of the images.

Figure 5:
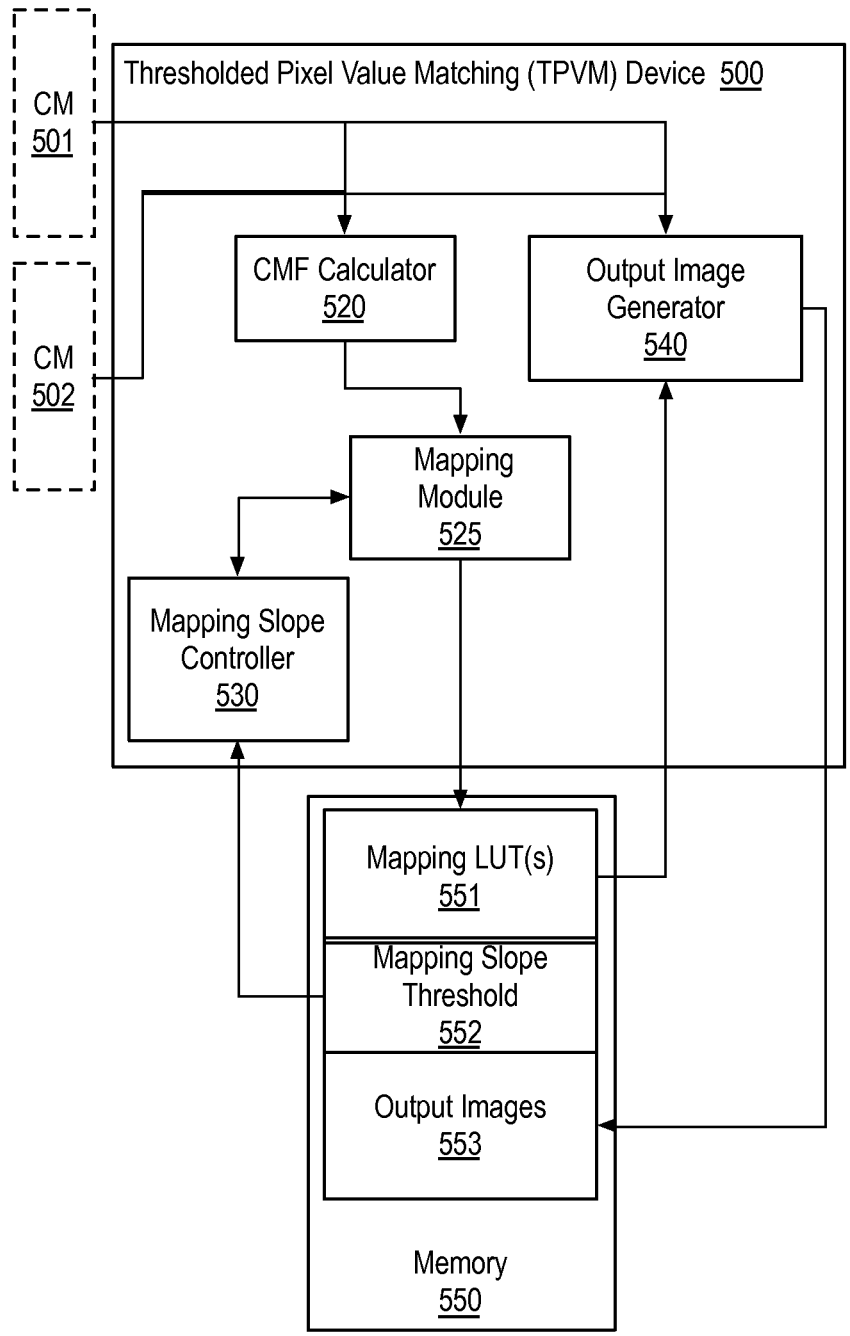
FIG. 5 is a functional block diagram of an image processing pipeline include a thresholded pixel value matching (TPVM) device, in accordance with embodiments.

FIG. 5 is a functional block diagram of a thresholded pixel value matching (TPVM) device 500, in accordance with embodiments. TPVM device 500 is computerized to perform the pixel value matching methods 201, 202 in an automated fashion in a pre-processing pipeline without a device user's intervention. TPVM device 500 is to receive or retrieve input image data associated with two images from a buffer storing a decoded representation of a plurality of input image frames, or captured images exposed at the input image resolution by a camera hardware modules (CM) 501, 502. In an alternate embodiment, input image frames are a pair of frames in a stream of consecutively exposed image data frames written to a buffer by CM 501 or CM 502 at a given video frame rate.

As further illustrated in FIG. 5, TPVM device 500 further includes a CMF calculator (calculation module) 520 coupled to receive the input image frames from CM 501 and CM 502. One or more CMF calculator 520 may be coupled in parallel to the CM 501 and CM 502. An output of CMF calculator 520 is coupled to an input of mapping module 525. Mapping module 525 is to consecutively determine an output pixel value for each input pixel value of the input images received based on the images respective pixel value CMFs. In one exemplary embodiment, mapping module 525 is to determine an 8-bit intensity map for each input image received from each of CM 501 and CM 502. In another exemplary embodiment, mapping module 525 is to determine an 8-bit color map for each of three color channels in an input image received from each of CM 501 and CM 502. Mapping module 525 is further coupled to mapping slope controller 530. Mapping slope controller 530 is to determine a slope of a mapping function employed by mapping module 525 between two pixel values by computing the difference between the mapping function evaluated at the first input pixel value and the mapping function evaluated at the second input pixel value, the first and second pixel values being consecutive values. The mapping slope controller is to further compare this difference in output pixel values with a mapping slope threshold value 552 stored in memory 550. Where the difference exceeds the slope threshold, the output pixel value to be stored in mapping LUT 551 is to be thresholded by mapping module 525. In further embodiments, two LUT 551 are generated. A first LUT 551 associates first input pixel values with first output pixel values for an input image received from CM 501. A second LUT 551 associates second input pixel values with second output pixel values for an input image received from CM 502. TPMV device 500 further includes an output image generator 540 coupled to the CM 501 and 502 to receive the input image data for the plurality of input images. Output image generator generates a first and second matched output image from first and second input images based on the LUT(s) 551. An output port of output image generator 540 is coupled to memory 550 and output image generator 540 is store output images 553 to memory 550.

Figure 6:
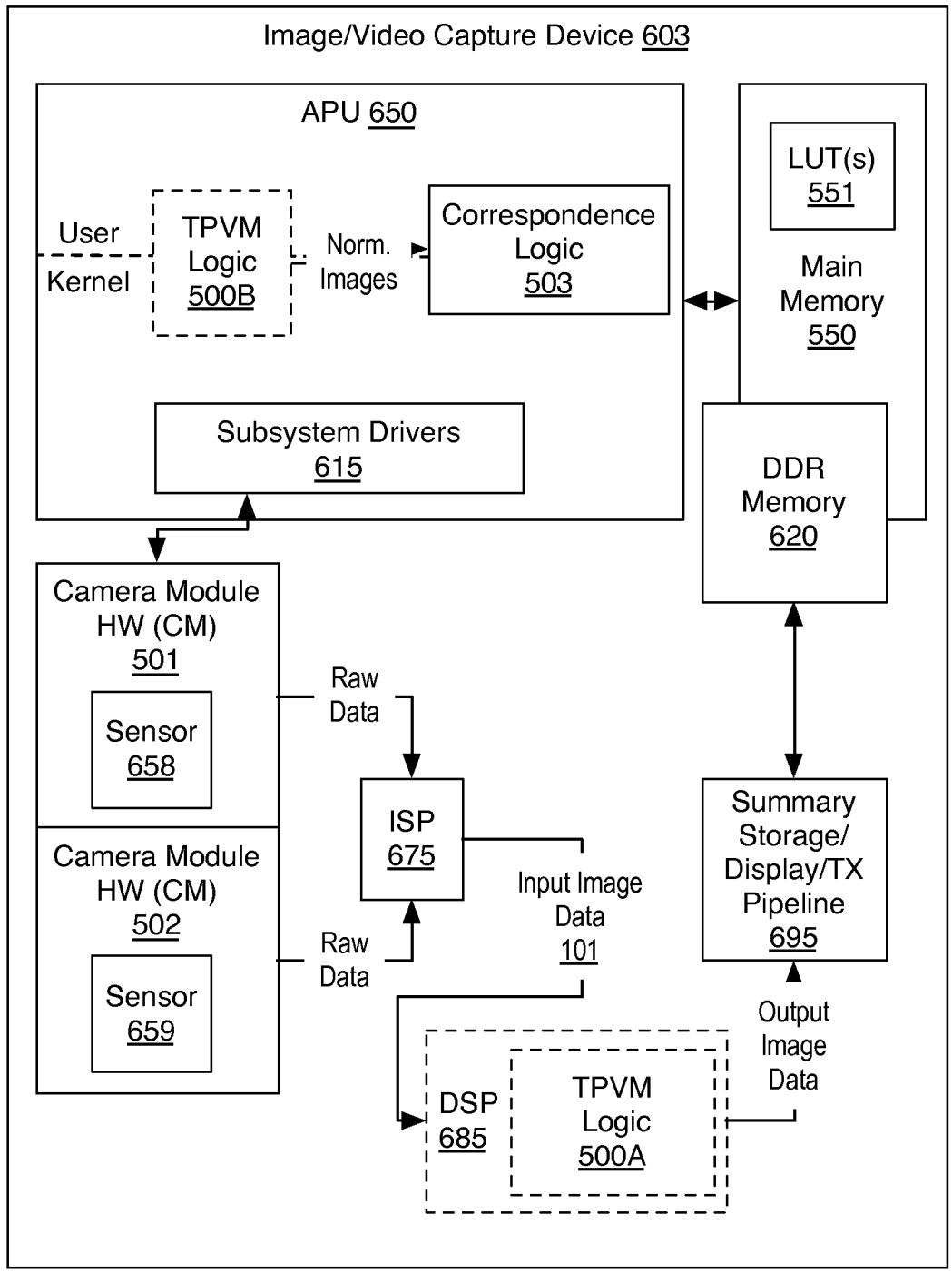
FIG. 6 illustrates an image capture device including a TPVM device, in accordance with one or more embodiment.

FIG. 6 further illustrates how thresholded pixel value matching device may be integrated with various other components of an image and/or video capture device 603 to provide enhanced video camera output suitable for pixel correspondence determinations and/or image depth processing. Video capture device 603 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Platform 603 includes CM 501 and CM 502. In the exemplary embodiment, CM 501 further includes a camera sensor 658 and CM 502 includes a camera sensor 659. Sensor 658 may be a HD, FHD, QXGA, WQXGA, QSXGA, or UHD format digital image device, for example. In one embodiment sensor 658 has at least 8 mega pixel resolution. Sensor 659 may be a HD, FHD, QXGA, WQXGA, QSXGA, or UHD format digital image device, for example. In one embodiment sensor 659 has a lower pixel resolution than sensor 658, for example 1-5 mega pixel. Although not illustrated in FIG. 6, in further embodiments, platform 603 further includes a third CM including a third camera sensor substantially the same as sensor 659 and three images output by the three sensors are matched by the platform 603.

Camera sensors 658, 659 may provide a color resolution of 8 bits, or more per pixel, is operable to capture continuous video frames progressively. Sensor 658 may have a pixel frequency of 170 MHz, or more. Camera sensors 658, 659 may include an RGB Bayer color filter, an analog amplifier, an A/D converter, other components to convert incident light into a digital signal corresponding to raw image data. Sensors 658, 659 may be controlled to operate a rolling shutter or electronic focal plane shutter process where pixels are read out progressively in a line-sequential fashion for a frame. In exemplary video embodiments, sensors 658, 659 output multiple consecutively exposed frames. CM 501, 502 may output raw data associated with the consecutively exposed frames in conformance with any known streaming protocol, such as a MIPI. Raw image/video data is input to ISP 675. ISP 675 is to receive and analyze frames of raw video data during the horizontal and/or vertical blanking periods associated with CM 501, 502. During raw image data processing, ISP 675 may perform one or more of color space conversion, noise reduction, pixel linearization, and shading compensation, for example.

Pre-processed video data output by ISP 675 may be buffered and queued as input image data ready for pixel value matching between two or more image frames. In exemplary embodiments, DSP 685 and/or applications processor (APU) 650 implements one or more of the thresholded pixel value matching modules depicted in FIG. 5. DSP 685 may for example include one or more fixed function, or semi-programmable logic circuits to perform one or more stages of the pixel matching methods 201, 202 described above. For example, a fixed function module may be utilized to implement one or more of CMF calculation, mapping function slope determination, output value calculation, and LUT creation. Subsystem drivers 615 within a kernel space of an operating system (OS) instantiated by APU 650 may control various pixel matching parameters, such as the mapping function slope threshold. Access to the pixel matching control parameters may be further provided through an application layer executing in a user space of the OS.

Both software and hardware implementations of the thresholded pixel value matching device 500 are well suited to implementing global pixel matching methods 201, 202 at minimal power. For hardware implementations, thresholded pixel matching device 500 may be implemented by fixed function logic, for example provided as TPVM 500A in DSP 685. For software implementations, any known programmable processor, including a core of APU 650, an execution unit of a graphics processor, or other similar vector processor, may be utilized to implement the logic of TPVM 500B. For such software-implemented embodiments, DSP 685 need not implement fixed function circuitry relevant TPVM device 500A (as denoted by dashed lines in FIG. 6). APU 650 may be solely responsible for generating matched output pixel values and output images from input image data received from ISP 675. Such software-based implementations are advantageously more flexible than fixed function logic circuitry. In one exemplary embodiment, the TPVM device 500B is instantiated through the user space or kernel space of APU 650, for example upon a user initiating an image capture routine. APU 650 executes the pixel value matching algorithms and outputs normalized (matched) images to a downstream image processing pipeline, for example including pixel correspondence determination logic 503. APU 650 may be programmed with instructions stored on a computer readable media to cause the processor to perform any of the operations of pixel matching methods 201, 202.

As further illustrated in FIG. 6, output image data may be output to storage/display/transmission pipeline 695. In one exemplary storage pipeline embodiment, matched output image data is written to electronic memory 620 (e.g., DDR, etc.) to supplement stored input image data. Memory 620 may be separate or a part of a main memory 610 accessible to APU 650. Alternatively, or in addition, storage/display/transmission pipeline 695 is to transmit output image data off video capture device 503.

In one exemplary embodiment illustrated by FIG. 6, APU 650 further includes correspondence logic 503 that is to implement one or more pixel correspondence computations. In embodiments, correspondence module 503 determines pixel correspondence based on output images matched by a TPVM device (e.g., 500B).

Figure 7:
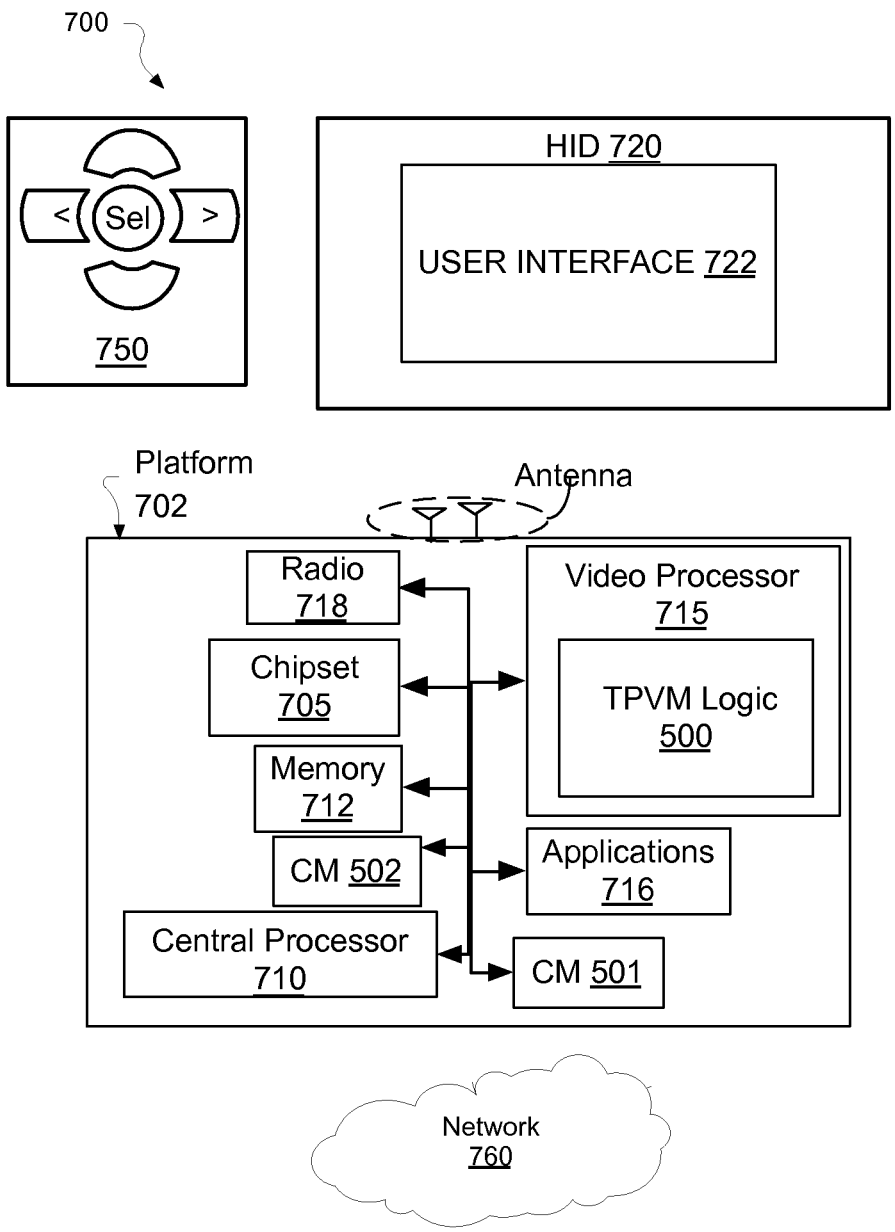
FIG. 7 is a diagram of an exemplary ultra-low power system with a TPVM device architecture, in accordance with one or more embodiment.

FIG. 7 is a diagram of an exemplary ultra-low power system 700 employing a thresholded pixel value matching device, in accordance with one or more embodiment. System 700 may be a mobile device although system 600 is not limited to this context. System 700 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

System 700 includes a device platform 702 that may implement all or a subset of the various pixel value matching methods and any of the pixel value device modules described above in the context of FIG. 2-FIG. 6. In various exemplary embodiments, video processor 715 executes pixel value matching. Video processor 715 includes logic circuitry implementing thresholded pixel value matching device 500 to modify pixel values of both a reference and input image, for example as described elsewhere herein. In some embodiments, one or more computer readable media may store instructions, which when executed by CPU 710 and/or video processor 715, cause the processor(s) to execute one or more thresholded pixel value matching algorithm, such as any of those described in detail above. Two or more matched image data frames exposed by CM 501 and/or CM 502 may then be stored in memory 712 as normalized/matched/rectified image data.

In embodiments, device platform 702 is coupled to a human interface device (HID) 720. Platform 702 may collect raw image data with CM 501 and 502, which is processed and output to HID 720. A navigation controller 750 including one or more navigation features may be used to interact with, for example, device platform 702 and/or HID 720. In embodiments, HID 720 may include any television type monitor or display coupled to platform 702 via radio 718 and/or network 760. HID 720 may include, for example, a computer display screen, touch screen display, video monitor, television-like device, and/or a television.

In embodiments, device platform 702 may include any combination of CM 501, chipset 705, processors 710, 715, memory/storage 712, applications 716, and/or radio 718. Chipset 705 may provide intercommunication among processors 710, 715, memory 712, video processor 715, applications 716, or radio 718.

One or more of processors 710, 715 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 712 may be implemented as a volatile memory device such as, but not limited to, a Random Access Memory (RAM), Dynamic Random Access Memory (DRAM), or Static RAM (SRAM). Memory 712 may also be implemented as a non-volatile storage device such as, but not limited to flash memory, battery backed-up SDRAM (synchronous DRAM), magnetic memory, phase change memory, and the like.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 8:
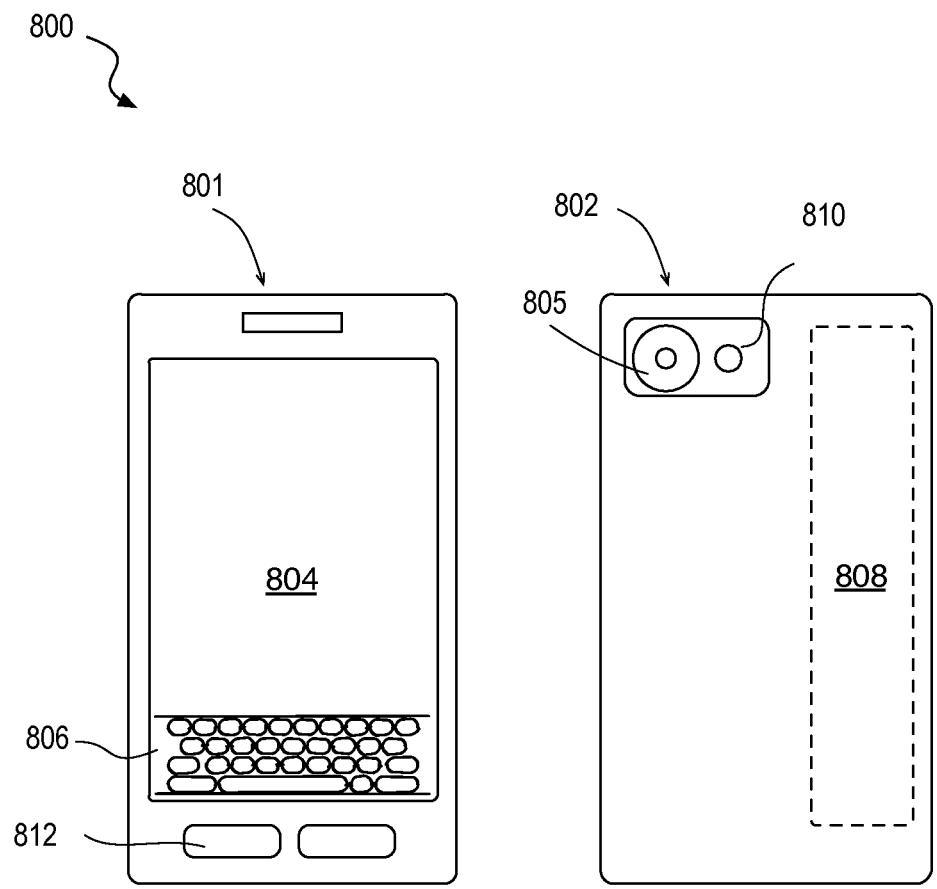
FIG. 8 is a diagram of an exemplary mobile handset platform, arranged in accordance with one or more embodiment.

As described above, system 700 may be embodied in varying physical styles or form factors. FIG. 8 further illustrates embodiments of a mobile handset device 800 in which system 700 may be embodied. In embodiments, for example, device 800 may be implemented as a mobile computing handset device having wireless capabilities. As shown in FIG. 8, mobile handset device 800 may include a housing with a front 801 and back 802. Device 800 includes a display 804, an input/output (I/O) device 806, and an integrated antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. Embodiments are not limited in this context. Integrated into at least the back 802 is cameras 805 and 810 (e.g., each including a lens, an aperture, and an imaging sensor), both of which may be components of one or more CM through which image data is exposed and output to the thresholded pixel value matching device as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiment, a computer implemented method for matching pixel values across a plurality of images includes receiving a plurality of input pixel values associated with a first input image and a plurality of reference pixel values associated with a second input image. The method further includes mapping a first input pixel value to a first output pixel value determined based on a first mapping function associating the first input pixel value with a first reference pixel value. The method further includes mapping a second input pixel value that is consecutive with the first input pixel value to a thresholded second output pixel value limited by a difference between the first input pixel value the first output pixel value. The method further includes storing the first and second output pixel values to a memory.

In furtherance of the first embodiment, the thresholded second output pixel value differs from the second input pixel value by a predetermined threshold amount more than the difference between the first input pixel value and the first output pixel value.

In furtherance of the first embodiment, the method further comprises mapping, to a third output pixel value, a reference pixel value associated with the second input pixel value by the first mapping function, and storing the third output pixel value to the memory.

In furtherance of the embodiment immediately above, mapping the reference pixel value to the third output pixel value further comprises mapping the reference pixel value to a value that differs from the reference pixel value by same amount that the thresholded second output pixel value differs from the second input pixel value.

In furtherance of the embodiment immediately above, the method further comprises determining cumulative mass functions associated with the first input image and the second input image. The method further comprises populating a first look up table (LUT) associating first input pixel values with first output pixel values determined based on the cumulative mass functions and the predetermined threshold. The method further comprises populating a second look up table (LUT) associating reference pixel values with second output pixel values based on the cumulative mass functions and the predetermined threshold. The method further comprises generating a first matched output image by applying the first LUT to the first input image and changing occurrences of the first input pixel values to the first output pixel values. The method further comprises generating a second matched output image by applying the second LUT to the second input image and changing occurrences of the reference pixel values to the second output pixel values. The method further comprises storing the first matched output image to the memory. The method further comprises storing the second matched output image to the memory.

In furtherance of the first embodiment, the first mapping function is dependent upon an input cumulative mass function of the input pixel values, and a reference cumulative mass function of the reference pixel values.

In furtherance of the embodiment immediately above, the method further comprises updating the reference cumulative mass function based on the third output pixel value, receiving a plurality of input pixel values associated with a third input image, and mapping an input pixel value of the third input image to a fourth output pixel value based on a mapping function dependent upon a cumulative mass function of the third input image, and the updated reference cumulative mass function.

In one or more second embodiment, a computer implemented method of histogram matching pixel values across a plurality of images includes iteratively determining, for all input images, modified pixel values for both a reference image and an input image based on their differing cumulative mass functions (CMF), wherein with each iteration the reference image CMF is updated to capture change in reference pixel values occurs with each iteration. The method further includes generating a matched output image from each input image by changing pixel values to values modified based on the CMF of each input image and the last updated CMF.

In furtherance of the second embodiment, the iterative determining of modified pixel values for both the reference image and all input images, further comprises determining a first cumulative mass function (CMF) for first input pixel values of first input image data. The iterative determining of modified pixel values for both the reference image and all input images further comprises determining a reference CMF of reference pixel values of reference image. The iterative determining of modified pixel values for both the reference image and all input images further comprises mapping the first input pixel values to reference-matched pixel values as a function of the first CMF and the reference CMF, wherein at least one first pixel value is mapped to a first reference-matched value that is thresholded based on a difference between another first input pixel value and its reference-matched pixel value. The iterative determining of modified pixel values for both the reference image and all input images further comprises mapping the reference pixel values to updated reference pixel values, wherein the updated reference pixel value is different than the mapped reference pixel value for one or more reference pixel value associated by the mapping function with a first pixel value mapped to a thresholded reference-matched value. The iterative determining of modified pixel values for both the reference image and all input images further comprises determining an updated reference CMF for the updated reference pixel values. The iterative determining of modified pixel values for both the reference image and all input images further comprises determining a second CMF for second input pixel values of second input image data. The iterative determining of modified pixel values for both the reference image and all input images further comprises mapping the first input pixel values to first output pixel values as a function of the first input CMF and the updated reference CMF. The iterative determining of modified pixel values for both the reference image and all input images further comprises mapping the second input pixel values to second output pixel values as a function of the second input CMF and the updated reference CMF. Generating a matched output image from each input image further comprises generating first output image data from the first image data by changing occurrences of the first pixel values to the first output pixel values, and generating second output image data from the second input image data by changing occurrences of the second input pixel values to the second output pixel values. The method further comprises generating third output image data by changing occurrences of the reference pixel values to the updated reference pixel values, storing the first, second, and third output image data to a memory.

In furtherance of the embodiment immediately above the method further includes determining a slope of the mapping function between two consecutive input pixel values by computing the difference between the mapping function evaluated at a first input pixel value and the mapping function evaluated at a second input pixel value, and modifying the reference pixel value where the slope exceeds a predetermined threshold.

In furtherance of the second embodiment, the input image and the reference image comprise a different number of pixels, and the input and reference pixel values comprise intensity or one color channel.

In one or more third embodiment, a computerized image matching device comprises a means to perform the method recited in any one of the preceding claims.

In furtherance of the third embodiment, the means further comprises at least one of an applications processor comprising a user space and a kernel space, or an image signal processor, the processor including logic circuitry to perform the method recited in any of the first embodiments.

In one or more fourth embodiment, computerized image matching device comprises an input port to receive a plurality of input pixel values associated with a first input image and a plurality of reference pixel values associated with a second input image. The device comprises a cumulative mass function (CMF) module coupled to the input port, the CMF module including logic to compute a CMF for each of the input pixel values and reference pixel values. The device comprises a mapping module coupled to the CMF module, the mapping module including logic to map the input pixel values to first output pixel values, the first output pixel values differing from the input pixel values by the lesser of a difference between an input pixel value and a reference pixel value associated with the input pixel value by a mapping function, and a predetermined threshold added to the amount by which a consecutive input pixel value differs from its mapped output pixel value. The device further includes a memory to store the output pixel values.

In furtherance of the fourth embodiment, the mapping module includes logic to map a first input pixel value to a first output pixel value determined based on a first mapping function associating the first input pixel value with a first reference pixel value. The mapping module includes logic to map a second input pixel value that is consecutive with the first input pixel value to a thresholded second output pixel value limited by a difference between the first input pixel value the first output pixel value. The mapping module includes logic to store the first and second output pixel values in a look up table associating the plurality of output pixel values with the plurality of input pixel values.

In furtherance of the embodiment immediately above, the mapping module further includes logic to map, to a third output pixel value, a reference pixel value associated with the second input pixel value by the first mapping function, and the memory is further to store the third output pixel value.

In furtherance of the embodiment immediately above, the mapping module is further to map the reference pixel value to a third output pixel value that differs from the reference pixel value by the same amount that the second input pixel value differs from the thresholded second output pixel value.

In furtherance of the fourth embodiment, the device further comprises a mapping function slope controller to determine a slope of the mapping function between two consecutive pixel values by computing a difference between the mapping function evaluated at the first input pixel value and the first mapping function evaluated at the second input pixel value.

In one or more fifth embodiment, one or more computer-readable storage media, with instructions stored thereon, which when executed by a processor, cause the processor to perform any one of the first embodiments.

In one more sixth embodiments, one or more computer-readable storage media, with instructions stored thereon, which when executed by a processor, cause the processor to perform a method comprising receiving a plurality of input pixel values associated with a first input image and a plurality of reference pixel values associated with a second input image, mapping a first input pixel value to a first output pixel value determined based on a first mapping function associating the first input pixel value with a first reference pixel value, mapping a second input pixel value that is consecutive with the first input pixel value to a thresholded second output pixel value that is limited by a difference between the first input pixel value the first output pixel value, and storing the first and second output pixel values to the memory.

In furtherance of the sixth embodiments the media further stores instructions thereon, which when executed by a processor, cause the processor to further perform a method comprising mapping, to a third output pixel value, a reference pixel value associated with the second input pixel value by the first mapping function, and storing the third output pixel value to the memory.

In furtherance of the sixth embodiment, the media further stores instructions thereon, which when executed by a processor, cause the processor to further perform a method further comprising mapping the reference pixel value to a value that differs from the reference pixel value by same amount that the thresholded second output pixel value differs from the second input pixel value.

In furtherance of the sixth embodiment, the first mapping function is dependent upon an input cumulative mass function of the input pixel value, and a reference cumulative mass function of the reference pixel values. Instructions stored thereon further cause the processor to perform a method further comprising generating a second reference cumulative mass function indicative of the third output pixel value, receiving a plurality of input pixel values associated with a third input image, and mapping an input pixel value in the third input image to a fourth output pixel value based on a third mapping function dependent upon a cumulative mass function of the third input image, and the second reference cumulative mass function.

In furtherance of the sixth embodiment, the media further stores instructions thereon, which when executed by a processor, cause the processor to further perform a method comprising determining cumulative mass functions associated with the first input image and the second input image, populating a first look up table (LUT) associating first input pixel values with first output pixel values determined based on the cumulative mass functions and the predetermined threshold, populating a second look up table (LUT) associating reference pixel values with second output pixel values based on the cumulative mass functions and the predetermined threshold, generating a first matched output image by applying the first LUT to the first input image and changing occurrences of the first input pixel values to the first output pixel values, generating a second matched output image by applying the second LUT to the second input image and changing occurrences of the reference pixel values to the second output pixel values, storing the first matched output image to the memory; and storing the second matched output image to the memory.

In furtherance of the sixth embodiment, the first mapping function is dependent upon an input cumulative mass function of the input pixel values, and upon a reference cumulative mass function of the reference pixel values.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer implemented method for matching pixel values across a plurality of images, the method comprising:
    receiving a plurality of input pixel values associated with a first input image and a plurality of reference pixel values associated with a second input image;
    mapping a first input pixel value to a first output pixel value determined based on a first mapping function associating the first input pixel value with a first reference pixel value;
    mapping a second input pixel value that is consecutive with the first input pixel value to a second output pixel value limited by a predetermined maximum difference between a result of first mapping function evaluated at the first input pixel value and a result of first mapping function evaluated at the second input pixel value;
    generating a matched output image by changing occurrences of the first input pixel values to the first output pixel values, and changing occurrences of the second input pixel values to the second output pixel values; and
    storing the matched output image to a memory.

2. The method of claim 1, wherein the method further comprises:
    mapping, to a third output pixel value, a reference pixel associated with the second input pixel value by the first mapping function; and
    storing the third output pixel value to the memory.

3. The method of claim 2, wherein mapping the reference pixel value to the third output pixel value further comprises summing a result of the mapping function evaluated at the first input pixel value with the predetermined maximum difference.

4. The method of claim 2, wherein the first mapping function is dependent upon an input cumulative mass function of the input pixel values, and a reference cumulative mass function of the reference pixel values.

5. The method of claim 4, wherein the method further comprises:
    updating the reference cumulative mass function based on the third output pixel value;
    receiving a plurality of input pixel values associated with a third input image; and
    mapping an input pixel value of the third input image to a fourth output pixel value based on a mapping function dependent upon the updated reference cumulative mass function and a cumulative mass function associated with the third input image.

6. The method of claim 2, further comprising:
    determining cumulative mass functions associated with the first input image and the second input image;
    populating a first look up table (LUT) associating first input pixel values with first output pixel values determined based on the cumulative mass functions and the predetermined threshold;
    populating a second look up table (LUT) associating reference pixel values with second output pixel values based on the cumulative mass functions and the predetermined threshold;
    generating a first matched output image by applying the first LUT to the first input image and changing occurrences of the first input pixel values to the first output pixel values;
    generating a second matched output image by applying the second LUT to the second input image and changing occurrences of the reference pixel values to the second output pixel values;
    storing the first matched output image to the memory; and
    storing the second matched output image to the memory.

7. A computer implemented method of histogram matching pixel values across a plurality of images, the method comprising:

iteratively determining, for all input images, modified pixel values for both a reference image and an input image based on their differing cumulative mass functions (CMF), wherein with each iteration the reference image CMF is updated to capture changes in reference pixel values occurring with each iteration; and generating a matched output image from each input image by changing pixel values to values modified based on the CMF of each input image and the last updated reference image CMF.

8. The method of claim 7, wherein the iterative determining of modified pixel values for both the reference image and all input images, further comprises:

determining a first cumulative mass function (CMF) for first input pixel values of first input image data;

determining a reference CMF of reference pixel values for the reference image;

mapping the first input pixel values to reference-matched pixel values as a function of the first CMF and the reference CMF, wherein at least one first input pixel value is mapped to a first reference-matched value that is limited by a predetermined maximum mapping function slope;

mapping the reference pixel values to updated reference pixel values, wherein an updated reference pixel value is different than the mapped reference pixel value for one or more reference pixel values associated with one of the first input pixel values mapped to a reference-matched value that was limited by the predetermined maximum slope;

determining an updated reference CMF for the updated reference pixel values;

determining a second CMF for second input pixel values of second input image data;

mapping the first input pixel values to first output pixel values as a function of the first input CMF and the updated reference CMF;

mapping the second input pixel values to second output pixel values as a function of the second input CMF and the updated reference CMF;

wherein generating a matched output image from each input image further comprises:

generating first output image data from the first image data by changing occurrences of the first pixel values to the first output pixel values;

generating second output image data from the second input image data by changing occurrences of the second input pixel values to the second output pixel values; and wherein the method further comprises:

generating third output image data by changing occurrences of the reference pixel values to the updated reference pixel values; and storing the first, second, and third output image data to a memory.

9. The method of claim 8, further comprising:

determining the slope of the mapping function between two consecutive input pixel values by computing the difference between the mapping function evaluated at a first input pixel value and the mapping function evaluated at a second input pixel value; and modifying the reference pixel value where the slope exceeds the predetermined maximum.

10. The method of claim 7, wherein:

the input image and the reference image comprise a different number of pixels; and the input and reference pixel values comprise intensity or one color channel.

11. A computerized image matching device, comprising:

an input port to receive a plurality of input pixel values associated with a first input image and a plurality of reference pixel values associated with a second input image;

one or more processors coupled to the input port, the processors including logic to compute a CMF for the input pixel values and a CMF for the reference pixel values; and map the input pixel values to first output pixel values as a function of the CMFs, the first output pixel values being the lesser of:

a result of a mapping function evaluated at the corresponding input pixel value; or a predetermine threshold value summed with a result of the mapping function evaluated at an input pixel value consecutive with the corresponding input pixel; and a memory to store the output pixel values.

12. The device of claim 11, wherein the one or more processors include logic to:

map a first input pixel value to a first output pixel value determined based on a first mapping function associating the first input pixel value with a first reference pixel value;

map a second input pixel value that is consecutive with the first input pixel value to a second output pixel value limited by a predetermined maximum difference between a result of first mapping function evaluated at the first input pixel value and a result of first mapping function evaluated at the second input pixel value; and store the first and second output pixel values in a look up table associating the plurality of output pixel values with the plurality of input pixel values.

13. The device of claim 12, wherein the one or more processors include logic to:

map, to a third output pixel value, a reference pixel value associated with the second input pixel value by the first mapping function; and wherein the memory is further to store the third output pixel value.

14. The device of claim 13, wherein the one or more processors are further to map the reference pixel value to a third output pixel value by summing a result of the mapping function evaluated at the first input pixel value with the predetermined maximum differ.

15. The device of claim 11, wherein the one or more processors are to determine a slope of the mapping function between two consecutive pixel values by computing a difference between the first mapping function evaluated at the first input pixel value and the first mapping function evaluated at the second input pixel value.

16. One or more non-transitory computer-readable storage media, with instructions stored thereon, which when executed by a processor, cause the processor to perform a method comprising:

receiving a plurality of input pixel values associated with a first input image and a plurality of reference pixel values associated with a second input image;

mapping a first input pixel value to a first output pixel value determined based on a first mapping function associating the first input pixel value with a first reference pixel value;

mapping a second input pixel value that is consecutive with the first input pixel value to a second output pixel value that is limited by a predetermined maximum difference between a result of first mapping function evaluated at the first input pixel value and a result of first mapping function evaluated at the second input pixel value;

generating a matched output image by changing occurrences of the first input pixel values to the first output pixel values, and changing occurrences of the second input pixel values to the second output pixel values; and storing the matched output image to a memory.

17. The media of claim 16, further storing instructions thereon, which when executed by a processor, cause the processor to further perform a method comprising:

mapping, to a third output pixel value, a reference pixel value associated with the second input pixel value by the first mapping function; and storing the third output pixel value to the memory.

18. The media of claim 17, further storing instructions thereon, which when executed by a processor, cause the processor to further perform a method further comprising summing a result of the mapping function evaluated at the first input pixel value with the predetermined maximum difference.

19. The media of claim 16, wherein:

the first mapping function is dependent upon an input cumulative mass function of the input pixel values, and a reference cumulative mass function of the reference pixel values; and the method further comprises:

generating a second reference cumulative mass function indicative of the third output pixel value;

receiving a plurality of input pixel values associated with a third input image; and mapping an input pixel value in the third input image to a fourth output pixel value based on a third mapping function dependent upon the second reference cumulative mass function and a cumulative mass function of associated with the third input image.

20. The media of claim 17, further storing instructions thereon, which when executed by a processor, cause the processor to further perform a method comprising:

determining cumulative mass functions associated with the first input image and the second input image;

populating a first look up table (LUT) associating first input pixel values with first output pixel values determined based on the cumulative mass functions and the predetermined threshold;

populating a second look up table (LUT) associating reference pixel values with second output pixel values based on the cumulative mass functions and the predetermined threshold;

generating a first matched output image by applying the first LUT to the first input image and changing occurrences of the first input pixel values to the first output pixel values;

generating a second matched output image by applying the second LUT to the second input image and changing occurrences of the reference pixel values to the second output pixel values;

storing the first matched output image to the memory; and storing the second matched output image to the memory.

21. The media of claim 16, wherein the first mapping function is dependent upon an input cumulative mass function of the input pixel values, and upon a reference cumulative mass function of the reference pixel values.

* * * * *